Jan. 16, 1923.

L. VANDE BRAKE.

EGG TRAY AND TURNER FOR INCUBATORS.

FILED APR. 22, 1922.

Inventor
Leonard Vande Brake,

By Watson E. Coleman
Attorney

Jan. 16, 1923.

L. VANDE BRAKE.

1,442,245.

EGG TRAY AND TURNER FOR INCUBATORS.
FILED APR. 22, 1922.

Inventor
Leonard Van de Brake,

By Watson E. Coleman
Attorney

Patented Jan. 16, 1923.

1,442,245

UNITED STATES PATENT OFFICE.

LEONARD VANDE BRAKE, OF ORANGE CITY, IOWA.

EGG TRAY AND TURNER FOR INCUBATORS.

Application filed April 22, 1922. Serial No. 556,030.

*To all whom it may concern:*

Be it known that I, LEONARD VANDE BRAKE, a citizen of the United States, residing at Orange City, in the county of Sioux and State of Iowa, have invented certain new and useful Improvements in Egg Trays and Turners for Incubators, of which the following is a specification, reference being had to the accompanying drawings.

The present invention has for its purpose the provision of a tray of the character and for the purpose indicated, wherein a plurality of revoluble rods are mounted in bearings of the tray, and employed for imparting uniform revoluble movements to the eggs, in combination with means for rotating all the rods simultaneously and in the same direction.

Another purpose is the provision of an egg turner or egg tray, wherein the eggs may be turned in either direction, preferably end over end. This may be accomplished by providing means to prevent the rods from spreading at their central portions. In other words this means comprises plates through which the rods pass, the plates being adjustable, and capable of being used as spacers. Furthermore in connection with turning the eggs end over end, it is the aim to place the eggs on the rods, so that they are in staggered positions, the purpose being to permit one row of eggs to keep the other row in alignment and vice versa.

Still another purpose is the provision of an egg tray, wherein a screen is employed beneath the revoluble rods, in order to support the chicks when hatched, when the incubator is without a nursery. However, when a nursery is employed, the screen otherwise usually employed beneath the rods, may be removed from either side of the tray, allowing the chicks to drop between the rods into the nursery. Also if the incubator is without a nursery, the screen may be placed on the top of the rods, so as to make an ordinary tray, that is an ordinary tray for the support of eggs to be hatched, without imparting revoluble movements to the eggs.

Still a further purpose is the provision of means consisting of a member to be supported on a cross piece of the egg turner or tray, so that should there be a half a row of eggs left, that is to say when testing whether or not the eggs are fertile, said half row of eggs may be held in position.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1:
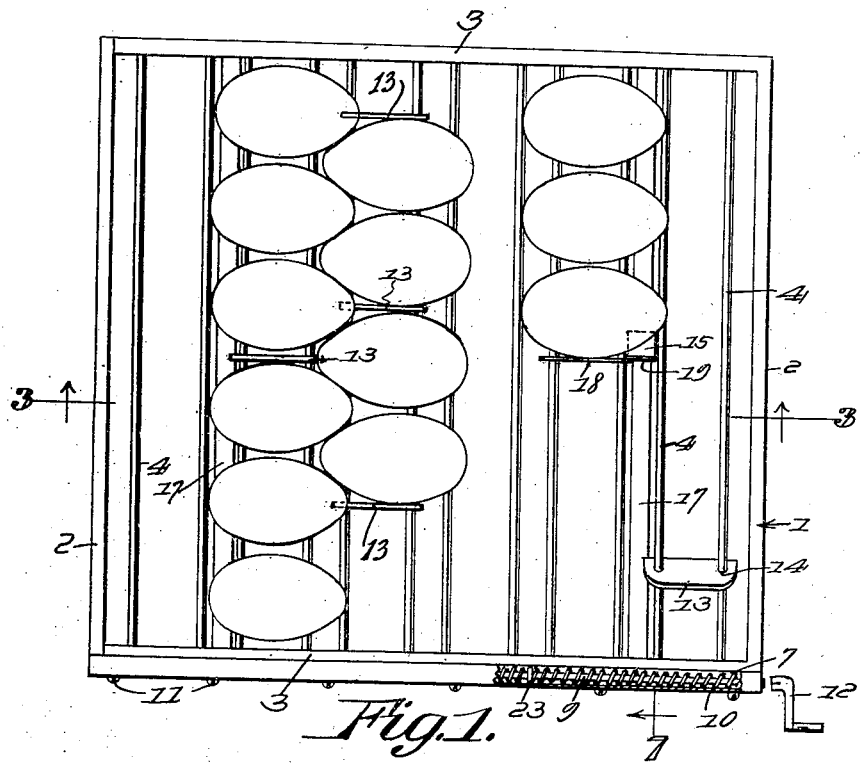
Figure 1 is a plan view of the improved egg tray and turner constructed in accordance with the invention, showing one end of the frame of the tray broken away.
Figure 3:
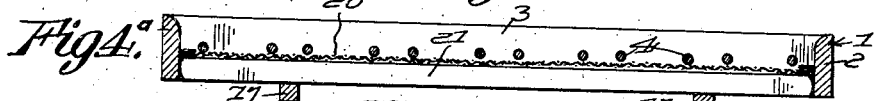
Figure 3 is a transverse sectional view on line 3—3 of the tray.
Figure 3:
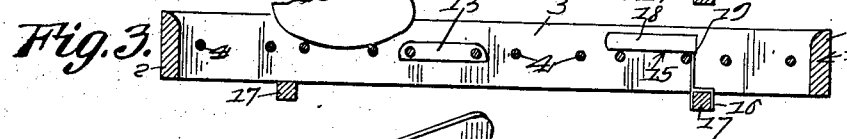
Figure 4:
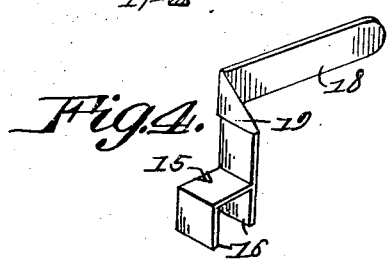
Figure 4 is a detail perspective view of a spacing member to hold a half row of eggs in position.
Figure 5:
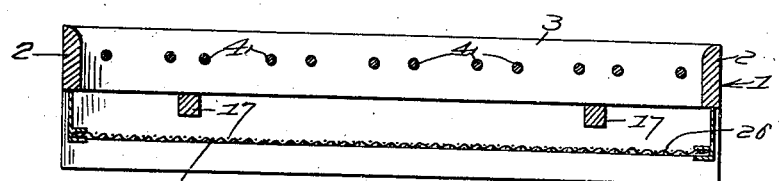
Figure 6:
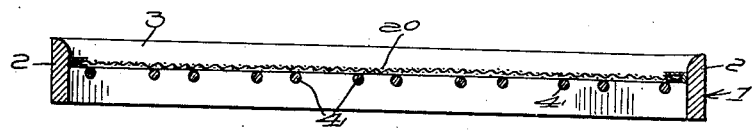
Figure 7:
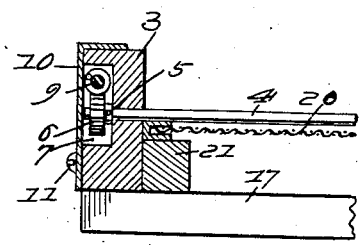
Figure 8:
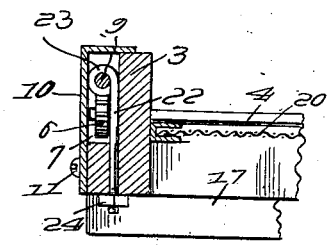
Figure 9:
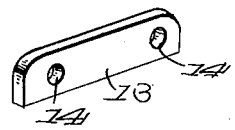

Figure 4ª is a transverse sectional view similar to Figure 3, but showing the screen in position immediately under the rods 4;

Figure 5 is a sectional view transversely of the tray, showing the same arranged of the tray, showing the same arranged above a nursery, with the screen usually employed below the rods, removed;

Figure 6 is a sectional view transversely of the tray showing the screen arranged upon the rods;

Figure 7 is an enlarged detail sectional view through one end of the frame on line 7—7 of Figure 1, showing the arrangement and construction of the means for rotating the revoluble rods;

Figure 8 is a similar view, but taken at a different location, in order to show the hook bearings carried by the frame, to hold the screw or worm rod or shaft in engagement with the gears which are carried by the revoluble rods; and Figure 9 is a detail view of one of the members to keep the rotating rods from spreading, and which member may be used as a spacer as previously stated.

Referring to the drawings, 1 designates the frame of the egg tray, which may be any suitable shape and proportions, prefer- ably as shown, in so far as the shape is concerned. The frame may be constructed of any suitable material preferably wood, and comprising side and end rails 2 and 3.

Mounted in bearings of the end pieces 3 of the tray frame is a plurality of revoluble rods 4, and secured upon the corresponding ends of the rods by means of the pins 5, are gears 6. As shown in Figure 7 one of the end pieces 3 of the egg tray frame is longitudinally recessed as shown at 7, for the reception of the gears 6. The gears 6 have collars through which the pins 5 pass and through the rods or shafts 4, to securely fasten the gears to the rods, and since the collars bear against the perpendicular wall of the recess 7, the rods 4 will be prevented from axial movement in one direction.

Mounted in suitable bearings 8 of the tray frame, adjacent the opposite ends of the recess 7 is a worm or screw shaft 9, which meshes or engages with the gears 6, so that when the worm or screw shaft 9 is rotated, slow gradual uniform revoluble movements are imparted to the plurality of rods 4 simultaneously. Obviously while the eggs are supported upon the rods 4, they uniformly rotate, as a result of the rotation of the rods, in order to insure proper hatching of the eggs. The thread of the worm or screw shaft or rod 9 is rounded in cross section, and the teeth of the gears 6 are sufficiently rounded on their edges, in order to insure proper meshing of the thread of the shaft 9 with the gears 6. Owing to this construction of the worm or screw shaft, it is unnecessary to have worm gears, which are more or less expensive. In fact ordinary gears may be used as the gears 6, in the actual construction of the machine.

In order to cover the plurality of gears 6 and the worm or screw shaft, and to protect them and keep out the dust, dirt and the like a shield or plate 10 is fastened to the end rail 3 which has the longitudinal recess 7. In fact this shield or plate is made of sheet metal and is angular in cross section, and the lower portion of one of these flanges is secured to the lower portion of the outer face of one of the end pieces 3 by means of screws 11. It will be noted that the ends of the rods 4 abut against the inner face of the plate 10, and prevent axial movement of the rods or shafts 4 in the opposite direction. It will be noted that the eggs may rest upon the rods, with their lengths crosswise of the rods, and by imparting a revoluble movement to the worm or screw shaft 9 by means of a crank 12, revoluble movements may be imparted to the eggs, in order to insure proper hatching of the eggs.

Mounted upon the rods 4 are members 13, which are in the form of plates provided with openings 14 for the rods, and are designed to prevent the rods from spreading at their central portions. In fact these members or plates are designed to hold the rods in parallelism, and may also be used for spacing the eggs. These members 13 are relatively loose on the rods, so that they can assume angular positions relatively to the rods, in order to permit of a slight looseness of play between the eggs. The eggs are permitted to accommodate themselves to each other during their revoluble movements.

As shown in Figures 1, 3 and 4 egg holders 15 are provided. Each holder comprises spaced flat arms at its lower end and an upright strip at its upper end. The flat arms 16 straddle the strip 17, whereas the upright strip of said member 15 rises between adjacent rods, and is bent at 19, so as to provide a lateral arm 18. When the holder 15 is in applied position, the arm 18 engages the egg as shown in Figure 1, and acts to hold a series or rows of eggs in position, when testing as to fertility or infertility of the eggs.

In order to support the chicks when hatched a screen 20 is arranged beneath the revoluble rods 4 as shown in Figure 3. In order to accomplish this result, strips 21 are engaged between the bars 17 and the screen 20, thereby forcing the screen up against the rods 4. Obviously by removing the strips 21 the chick supporting screen 20 may be removed from either side of the tray. For instance the screen is more or less pliable or flexible, and therefore permitted to be slightly sprung, so as to allow it to be pulled from either side of the tray. It will be noted that the strips 21 may be arranged inwardly of the ends of the tray, or arranged immediately adjacent the ends, as shown in Figure 7.

In order to hold the worm shaft or rod 9 in position, and in mesh with all the gears 6, for the purpose of insuring uniform movement of the rods 4, bolts 22 pass upwardly through one of the end strips 3 of the frame and have hooks 23 at their upper ends overlying the shaft or screw. The lower ends of the bolts 22 are provided with nuts 24, so as to draw the hooks 23 securely in engagement with the screw or shaft 9, thereby causing the thread or teeth of the shaft to firmly engage the teeth of the gears 6. It is obvious that the bolts 22 may be adjusted sufficiently to cause pressure of the hooks upon the screw or shaft 9, so as to cause a binding action between the thread and the gears, thereby preventing the operator from turning the rods 4 too rapidly, which would be the case if the meshing of the shaft or screw 9 with the gears should be more or less loose.

As shown in Figure 5 the tray is supported upon a nursery tray, and the flexible screen 20 removed, so that when the chicks are hatched, they may drop between the rods 4 upon the screen 25 of the nursery tray 26. In Figure 6 the tray is employed in the ordinary manner. In fact the screen 20 is removed from below the rods, and is placed upon the top of the rods, and in this case the screen supports the eggs in the usual way.

Figure 2:
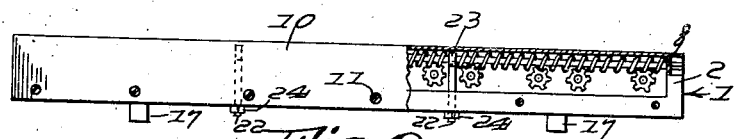
Figure 2 is an end view of the tray shown in Figure 1, showing the end of the tray partly broken away to show the operating means for the revoluble rods.

The screw or shaft 9 has its thread interrupted at certain locations, as shown clearly in Figure 2, so as to permit the hook end 23 of each bolt 22 to engage over the screw or shaft. In order to construct a rounded thread upon the screw or shaft 9, a heavy wire formed in a coil may be fitted telescopically over the rod, and soldered or otherwise fastened thereto, possibly frictionally, brazed or spot welded. However the invention is not to be limited to this precise construction of the screw or shaft 9, for ordinary screws or shafts of this character can be purchased from the open market, and in order to mount the screw or shaft in the manner shown, for instance by the bolts 22, the thread of the screw may be cut at certain locations and removed, so as to provide an interrupted thread as shown in the drawings.

The invention having been set forth, what is claimed is:—

1. In an egg tray, a frame, a plurality of revoluble rods mounted in bearings of the ends of the frame and upon which the eggs are mounted for revoluble movement, and means comprising spacers adjustable and tiltable to assume angular positions between the sides of the eggs, whereby said spacers may bind upon the rods for preventing excessive creeping movement of the eggs, and to prevent spreading of the central portions of the rods.

2. In an egg tray, a frame, a plurality of revoluble rods mounted in bearings of the ends of the frame and upon which the eggs are mounted for revoluble movement end over end, and plates having openings at the ends of the plates through which the rods loosely pass, whereby said plates may tilt and bind on the rods and act to prevent spreading of the rods.

3. In an egg tray, a frame, a plurality of revoluble rods mounted in bearings of the frame, cross pieces in the bottom of the frame, a screen beneath the rods, and means interposed between the screen and the cross pieces for holding the screen up against the under portions of the rods, the frame of said screen being flexible, so as to be slightly distorted to permit the removal of the screen when the holding means are removed.

4. In an egg tray, a frame, revoluble rods mounted in bearings thereof, cross pieces on the bottom of the frame, and a holder having spaced arms to straddle a cross piece and having a portion extending between the rods, said portion having a lateral arm to contact with an egg to hold a half a row of eggs in position when testing the eggs.

5. In an egg tray, a frame, revoluble rods mounted in bearings thereof, cross pieces on the bottom of the frame, holders having spaced arms to straddle said cross pieces, each holder having a portion extending between the rods, means carried by said portion to contact with an egg to hold a half a row of eggs in position when testing the eggs, and means on one end of the frame and operatively connecting with said rods for rotating the same, whereby the eggs may be turned while testing them.

6. In an egg tray, a frame, a plurality of revoluble rods mounted in bearings thereof, cross pieces on the bottom of the frame, a screen beneath the rods, bars adjustable to any position between the frame of the screen and said cross pieces for holding the screen up against the under portions of the rods.

7. In an egg tray, a frame, a plurality of revoluble rods mounted in bearings thereof, cross pieces on the bottom of the frame, a screen beneath the rods, bars adjustable to any position between the frame of the screen and said cross pieces for holding the screen up against the under portions of the rods, means on one end of the frame and operatively connecting with said rods for rotating them, the frame of said screen being flexible, whereby it may be slightly distorted, to permit the removal of the screen, when said holding bars are removed.

8. In an egg tray, a frame, revoluble rods mounted in bearings thereof, plates having openings at their ends and through which the rods loosely pass, whereby said plates may tilt, said plates when tilted binding on the rods while engaging between the eggs, to hold certain of the eggs in position, means carried by one end of the frame and operatively connected to the rods for rotating them, cross pieces on the bottom of the frame, a holder mounted on each cross piece and extending between the rods and provided with means at its upper end to engage with an egg to hold a half a row of certain of the eggs in position when testing them.

In testimony whereof I hereunto affix my signature.

LEONARD VANDE BRAKE.